(12) United States Patent
Wang et al.

(10) Patent No.: US 9,760,670 B2
(45) Date of Patent: Sep. 12, 2017

(54) SEMICONDUCTOR DEVICE DESIGN METHODS AND CONDUCTIVE BUMP PATTERN ENHANCEMENT METHODS

(71) Applicant: Taiwan Semiconductor Manufacturing Company, Ltd., Hsin-Chu (TW)

(72) Inventors: Tzu-Yu Wang, Taipei (TW); Wei-Cheng Wu, Hsin-Chu (TW); Kuo-Ching Hsu, Taipei (TW); Shang-Yun Hou, Jubei (TW); Shin-Puu Jeng, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 15/174,795

(22) Filed: Jun. 6, 2016

(65) Prior Publication Data
US 2016/0283639 A1    Sep. 29, 2016

Related U.S. Application Data (62) Division of application No. 14/084,813, filed on Nov. 20, 2013, now Pat. No. 9,372,951.

(51) Int. Cl.
*G06F 17/50* (2006.01)
*H01L 23/00* (2006.01)

(52) U.S. Cl.
CPC ...... *G06F 17/5077* (2013.01); *G06F 17/5009* (2013.01); *G06F 17/5081* (2013.01); *G06F 2217/02* (2013.01); *G06F 2217/06* (2013.01); *G06F 2217/08* (2013.01); *G06F 2217/38* (2013.01); *G06F 2217/40* (2013.01); *H01L 24/11* (2013.01); *H01L 24/13* (2013.01); *H01L 2224/13005* (2013.01); *H01L 2224/16227* (2013.01); *H01L 2924/15311* (2013.01)

(58) Field of Classification Search
CPC ........................................................ G06F 17/50
USPC ........................................................ 716/135
See application file for complete search history.

(56) References Cited

U.S. PATENT DOCUMENTS 7,926,017 B2    4/2011    Chang et al.
8,645,887 B2    2/2014    Lai et al.
(Continued)

FOREIGN PATENT DOCUMENTS

CN    101661517 A    3/2010
CN    102089762 A    6/2011

OTHER PUBLICATIONS

Wikipedia, "Coefficient of determination," http://en.wikipedia.org/wiki/Coefficient_of_determination, retrieved Oct. 10, 2013, 9 pages.

*Primary Examiner* — Thuan Do
(74) *Attorney, Agent, or Firm* — Slater Matsil, LLP (57) ABSTRACT

Semiconductor device design methods and conductive bump pattern enhancement methods are disclosed. In some embodiments, a method of designing a semiconductor device includes designing a conductive bump pattern design, and implementing a conductive bump pattern enhancement algorithm on the conductive bump pattern design to create an enhanced conductive bump pattern design. A routing pattern is designed based on the enhanced conductive bump pattern design. A design rule checking (DRC) procedure is performed on the routing pattern.

20 Claims, 7 Drawing Sheets (56) References Cited

U.S. PATENT DOCUMENTS

2005/0129304 A1* 6/2005 Sasazawa .......... G01B 11/0608
  382/150
2005/0132306 A1   6/2005 Smith et al.
2015/0143324 A1   5/2015 Wang et al.

* cited by examiner

SEMICONDUCTOR DEVICE DESIGN METHODS AND CONDUCTIVE BUMP PATTERN ENHANCEMENT METHODS

PRIORITY CLAIM AND CROSS-REFERENCE

This application is a division of U.S. application Ser. No. 14/084,813, filed on Nov. 20, 2013, which application is hereby incorporated herein by reference.

BACKGROUND

Semiconductor devices are used in a variety of electronic applications, such as personal computers, cell phones, digital cameras, and other electronic equipment, as examples. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Dozens or hundreds of integrated circuits are typically manufactured on a single semiconductor wafer. The individual dies are singulated by sawing the integrated circuits along a scribe line. The individual dies are then packaged separately, in multi-chip modules, or in other types of packaging, for example.

The semiconductor industry continues to improve the integration density of various electronic components (e.g., transistors, diodes, resistors, capacitors, etc.) by continual reductions in minimum feature size, which allow more components to be integrated into a given area. These smaller electronic components also require smaller packages that utilize less area than packages of the past, in some applications.

Wafer level packaging (WLPs) and chip-on-wafer-on-substrate (CoWoS) packages are some examples of smaller package types that are under development.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of some of the embodiments of the present disclosure are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Some embodiments of the present disclosure are related to methods of designing semiconductor devices. Novel semiconductor device design methods and conductive bump pattern enhancement methods will be described herein. The methods comprise design methods for semiconductor devices that will be packaged in wafer level packaging (WLP) packages, chip-on-wafer-on-substrate (CoWoS) packages, and other packaging types.

Figure 1:
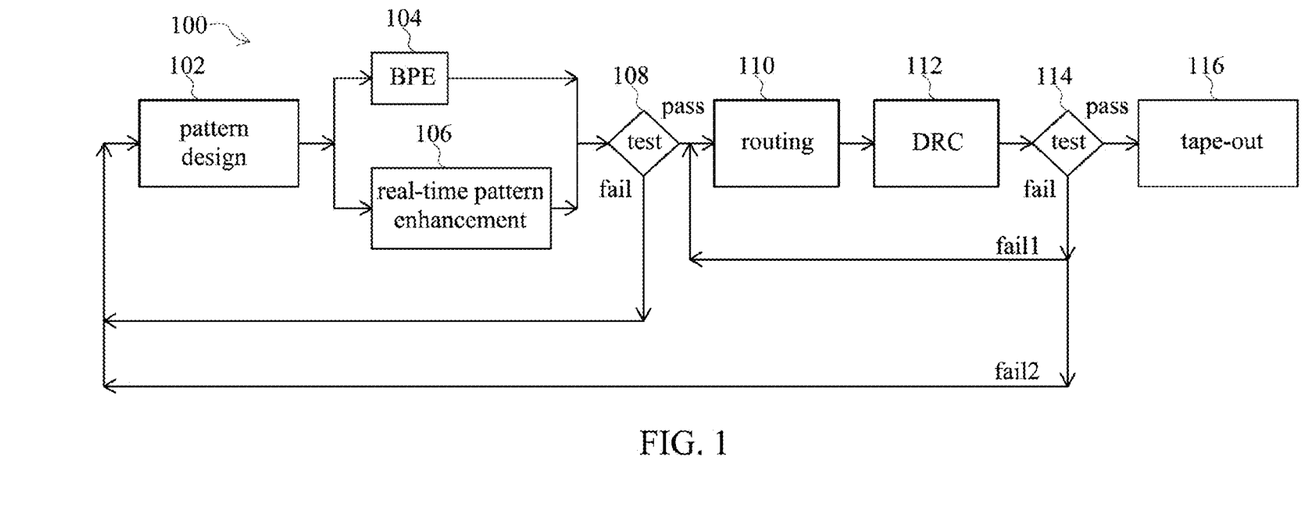
FIG. 1 is a flow chart illustrating a method of designing a semiconductor device in accordance with some embodiments of the present disclosure.

FIG. 1 is a flow chart 100 illustrating a method of designing a semiconductor device (see semiconductor device 156 shown in FIG. 10) in accordance with some embodiments of the present disclosure. Step 102 comprises a "pattern design" step for the semiconductor device, wherein a conductive bump pattern for the semiconductor device is designed. A semiconductor device designer or designers create the initial conductive bump pattern in the pattern design step 102, for example. The conductive bump pattern comprises a pattern for a plurality of microbumps or other types of connections in accordance with some embodiments, for example. The conductive bump pattern indicates a position for each terminal on a semiconductor device that requires external electrical connection, for example.

Step 104 comprises a "BPE" or bump pattern enhancement step, wherein a conductive bump pattern enhancement algorithm is implemented on the conductive bump pattern design from step 102 to create an enhanced conductive bump pattern design. The BPE step 104 is used for analysis and optimization of the conductive bump pattern. The BPE step 104, in some embodiments, is implemented in real time concurrently with step 106 which comprises a "real time pattern enhancement" step. The BPE step 104 and real time pattern enhancement step 106 provide real-time feedback and modification of the conductive bump pattern. The positions of conductive bumps in the conductive bump pattern are moved or altered as appropriate during the BPE step 104 and real time pattern enhancement step 106, for example. The BPE step 104 will be described further herein with reference to FIG. 2.

After the BPE step 104 and the real time pattern enhancement step 106, a test 108 comprising a pass/fail test is performed in some embodiments. If the test 108 is failed, the method comprises repeating the pattern design step 102, and then repeating the BPE step 104 and real-time pattern enhancement step 106. Step 102 and then steps 106 and 108 are repeated until the test 108 is passed. If the test 108 is passed, step 110 is performed, which comprises a "routing"

step, wherein a routing pattern is designed based on the enhanced conductive bump pattern design achieved by implementing the BPE step 104 and the real-time pattern enhancement step 106.

Step 112 comprises a "DRC" or design rule checking step wherein a DRC procedure is performed on the routing pattern produced in step 110. After the DRC step 112, a test 114 comprising a pass/fail test in some embodiments is performed. If the routing pattern passes the test 114, step 116 comprising a "tape-out" step is performed. The tape-out step 116 comprises creating a foundry memory record of the routing pattern, such as creating a final file and storing it to a tape, compact disk (CD), disk or other type of storage medium, that can be transmitted or given to a foundry and used by the foundry to manufacture a lithography photomask that will be used to manufacture (e.g., pattern) the semiconductor devices. However, if the routing pattern fails the test 114, steps 102, 104, 106, 110, and/or 112 (and also step 108 in some embodiments) are repeated, until the test 114 is passed, before performing the tape-out step 116. For example, in FIG. 1, if a designer determines from the test 114 that metal trace portions of the routing pattern need to be redesigned, e.g., the metal trace widths and spaces violate a predetermined minimum and maximum width and space rule, yet the bump pattern is acceptable, then the "fail1" state is determined, and the method includes returning to step 110. However, if the designer determines from the test 114 that both the bump pattern and the metal routing need to be redesigned, then the "fail2" state is determined, and the method includes returning to step 102. Other failure conditions may be included in the test 114, in other embodiments.

Figure 2:
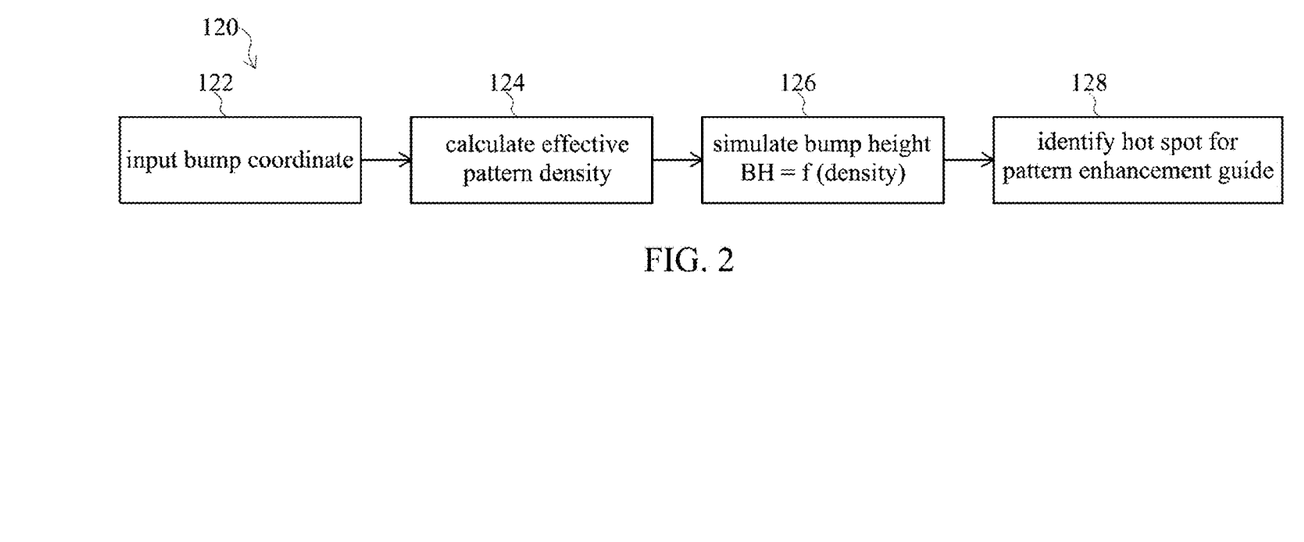
FIG. 2 is a flow chart illustrating a method of enhancing a conductive bump pattern of a semiconductor device in accordance with some embodiments.

FIG. 2 is a flow chart 120 illustrating a method of enhancing a conductive bump pattern of a semiconductor device in accordance with some embodiments. The flow chart 120 shows more details regarding the BPE step 104 of FIG. 1. The BPE step 104 of FIG. 1 includes the steps 122, 124, 126, and 128 shown in the flow chart 120 shown in FIG. 2 in some embodiments, for example.

Step 122 of the flow chart 120 shown in FIG. 2 comprises an "input bump coordinate" step 122 wherein a plurality of coordinates for a conductive bump pattern design are input, e.g., into a computer system. A computer aided design (CAD) system such as one manufactured by Cadence Design Systems, Inc. or other vendors may be used, for example. Alternatively, other types of computer systems or devices may be used to implement the conductive bump pattern enhancement methods and algorithms of various embodiments of the present disclosure. The conductive bump pattern of the semiconductor device comprises a pattern for a plurality of conductive bumps. The input bump coordinate step 122 comprises inputting the plurality of coordinates in an (xi, yi) format for each of the plurality of conductive bumps in the conductive bump pattern, wherein "i" is a number of each of the plurality of conductive bumps, in some embodiments.

After step 122, step 124 is performed, which comprises a "calculate effective pattern density" step 124, wherein an effective conductive bump pattern density for the conductive bump pattern design is calculated. The calculate effective pattern density step 124 will be described further herein with reference to FIGS. 3a and 3b. After step 124, step 126 is performed, which comprises a "simulate bump height BH=f (density)" step 126 wherein a conductive bump height for the conductive bump pattern design is simulated. The simulate bump height BH=f(density) step 126 will be described further herein with reference to FIGS. 4 through 7. Step 128 is then performed, which comprises an "identify hot spot for pattern enhancement guide", wherein hot spots are identified to create a pattern enhancement guide for the conductive bump pattern design. The identify hot spot for pattern enhancement guide step 128 will be described further herein with reference to FIGS. 8 and 9.

Figure 3A:
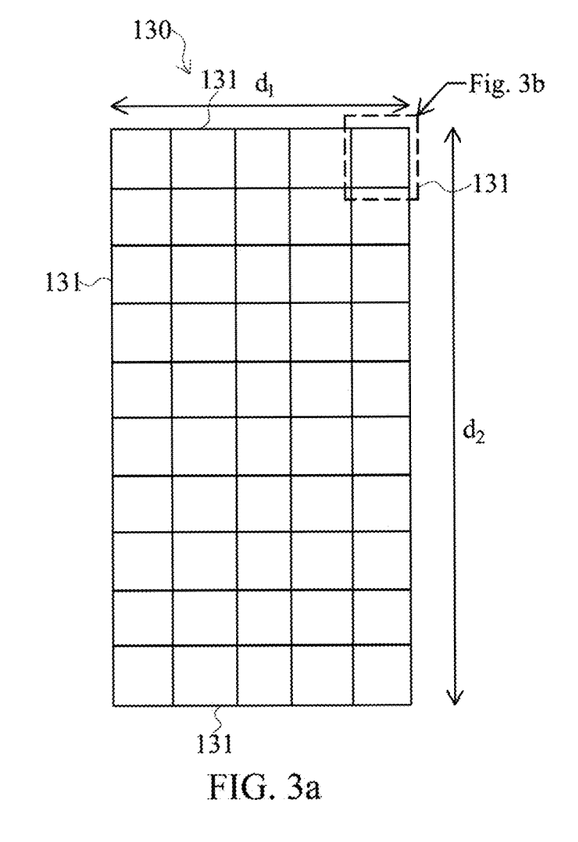
FIGS. 3a and 3b illustrate patterns that may be used to determine an effective density percentage of a conductive bump pattern in accordance with some embodiments.
Figure 3B:
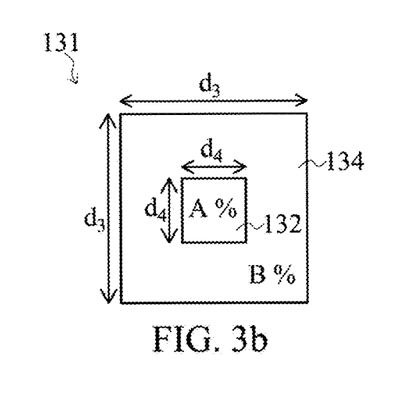

The calculate effective pattern density step 124 of FIG. 2 that is used to determine or calculate an effective conductive bump pattern density for the conductive bump pattern design will next be described with reference to FIGS. 3a and 3b. FIG. 3a illustrates an example of a total package area 130 in accordance with some embodiments. The total package area 130 comprises a width comprising dimension d1 and a length comprising dimension d2. Dimension d1 may comprise about 5 mm, and dimension d2 may comprise about 10 mm, with an overall package area of about (5×10)=500 mm2, as an example. Alternatively, dimensions d1, d2, and the overall package area may comprise other values. FIG. 3b illustrates a "unit area" 131 for a local bump density calculation of the total package area 130 shown in FIG. 3a in accordance with some embodiments of the present disclosure. The unit area 131 may comprise a dimension d3 on each side, for example. Dimension d3 may comprise about 1 mm, as an example. Alternatively, dimension d3 may comprise other values. To obtain the local bump density of the total package area 130, each of the unit areas 131 of the total package area 130 is used.

For example, a conductive bump area 132 of the unit areas 131 is first selected, as shown in FIG. 3b. The selected conductive bump area 132 may comprise a dimension d4 on each side, for example. Dimension d4 may comprise about 0.2 mm to about 0.4 mm, as an example. Alternatively, dimension d4 may comprise other values. The selected conductive bump area 132 is surrounded by a surrounding area 134, which may or may not include conductive bumps, depending on the design. A density A % of the selected conductive bump area 132 is calculated, and a density B % of the surrounding area 134 that surrounds the selected conductive bump area 132 is calculated. If area 134 does not include conductive bumps, the B % comprises 0%, for example. If area 134 includes conductive bumps, the B % comprises n %, as another example. The effective conductive bump pattern density percentage for the conductive bump pattern design is calculated from the selected conductive bump area 132 density A % and the surrounding area 134 density B %.

In some embodiments, calculating the effective density percentage of the conductive bumps (D) comprises solving Equation 1:

$$D = (w*A\ \% + (1-w)*B\ \%);\qquad\text{Eq. 1:}$$

wherein the variable w comprises a weighted value. The value of the variable w in Equation 1 is determinable by real silicon data regression. The real silicon data is obtained by measuring the data, i.e., the bump height is measured using measuring equipment, such as an inspection tool manufactured by Camtek Inc. or other manufacturers, for example. The data regression comprises using a statistical method such as a least square regression or other methods to determine the correlation of the bump height and the effective pattern density D. The correlation of the bump height and the effective pattern density D are determined in some embodiments by the densities A %, B %, and the weighted value "w", for example. In other words, the bump height can be measured, the densities A % and B % can be calculated, and a statistical method is used to find the optimal value of the weighted value w, in accordance with some embodiments, for example. Some examples values of the variable w are about 0.3 to about 0.5, for example. Alternatively, w may comprise other values.

As an example of using Equation 1 to determine the effective bump density percentage D of the unit area 131 shown in FIG. 3b, the bump density of the selected conductive bump area 132 comprising dimension d4×d4 is A %, and the bump density of the surrounding area 134 comprising dimension (d3×d3−d4×d4) is B %. Thus, utilizing Equation 1, the effective bump density percentage D of the unit area 131 comprising dimension d3×d3 is equal to about w*A %+(1−w)*B %.

In accordance with some embodiments, the conductive bump area and count determine A % or B %. For example, if the size of each conductive bump comprises an area comprising a dimension of about 0.1 mm2, and there are a total of 3 conductive bumps in a selected conductive bump area 132 comprising a dimension d4 of about 1×1 mm2, the conductive bump density A % of the selected conductive bump area 132 comprises about 0.3%.

Step 126 of FIG. 2 will next be described. Step 126 comprises simulating a conductive bump height for the conductive bump pattern design. The conductive bump height represented by BH is simulated as a function of a density [BH=f(density)] of the conductive bumps. Simulating the conductive bump height comprises using a regression model by inputting the calculated effective density into the regression model, wherein the regression model outputs an estimated conductive bump height.

Figure 4:
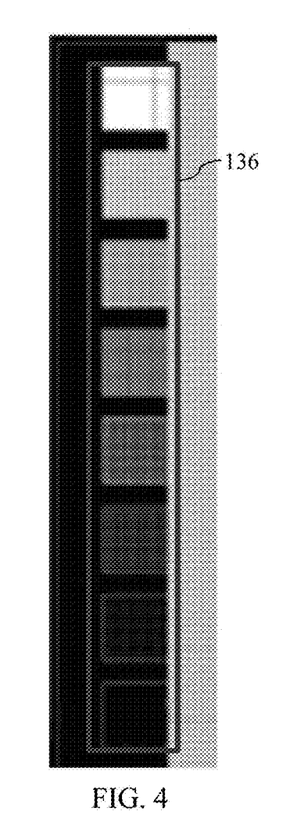
FIGS. 4 and 5 illustrate a regression model that can be used to determine simulated conductive bump height in accordance with some embodiments.
Figure 5:
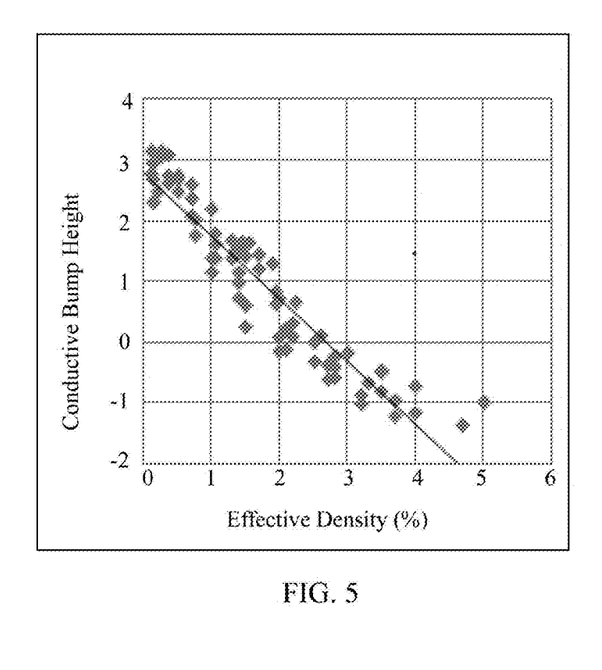

FIGS. 4 and 5 illustrate a regression model that is used to determine simulated conductive bump height in accordance with some embodiments. An example of a bump pattern design with a low to high density, designed for a regression model build-up is shown in FIG. 4. FIG. 4 illustrates a design that covers a plurality of different bump densities. Within the selected rectangular area 136 there are a total of 8 blocks of bumps, to enable the analysis and/or study of a correlation between the bump height and the bump density, from a low to high density. Each white point in the blocks represents a bump: the higher the bump density of the blocks, the more white points there are in the blocks. To enhance the model accuracy, each block is separated into smaller blocks (e.g., as illustrated in FIGS. 3a and 3b) to obtain the regional bump density and average bump height, for example. Then, the correlation of the effective pattern density of the smaller blocks with the average bump height is found.

As an example, if the block size is 3×3 mm2, the 3×3 mm2 block is separated into 9 smaller blocks, each with a size of 1×1 mm2. Each 1×1 mm2 block would have a different effective bump density D determinable using Equation 1, because the surrounding density B % is different for each block. Using a regression method and the correlation of the effective bump density of each 1×1 mm2 block, the average bump height of each block can be calculated, as shown in FIG. 5.

The correlation model of the effective pattern density and the average BH can be established using the regression method in accordance with embodiments of the present disclosure. As shown in FIG. 5, an index R2 which in some embodiments is called a regression coefficient or a coefficient of determination shows a strong correlation; then, the correlation model can be used to estimate the average bump height from any kind of pattern with different effective pattern densities. Such as the pattern shown in FIG. 6, to be described further herein, which has a different pattern design than the pattern shown in FIG. 4: the average bump height can be calculated by inputting the effective pattern density into the correlation model.

Referring again to FIG. 5, the regression model accuracy can be determined in some embodiments by the index R2. The higher the regression coefficient R2, the higher the correlation between the bump height and the bump effective density D, while the effective density is adjustable with the suitable weighed value w. Therefore, the bump height of a kind of pattern density can be estimated using various embodiments of the present disclosure. As an example, a regression model of the bump patterns shown in FIG. 4 is shown in FIG. 5, which is a chart of conductive bump heights in the Y axis for a range of effective density values (%) in the X axis. In the embodiment shown, the regression coefficient R2 is about 0.89 based on the example data points shown in the graph of FIG. 5. Several methods can be used to calculate the regression coefficient R2 in accordance with various embodiments of the present disclosure. In some embodiments, index R2 is a square of a sample correction coefficient between outcomes and their predicted values, as an example. In other embodiments, an Excel™ spreadsheet by Microsoft™ can be used to arrive at the values of the index R2, as another example. Alternatively, R2 may comprise other values, may be determined using other equations, and/or may be determined using other methods.

Figure 6:
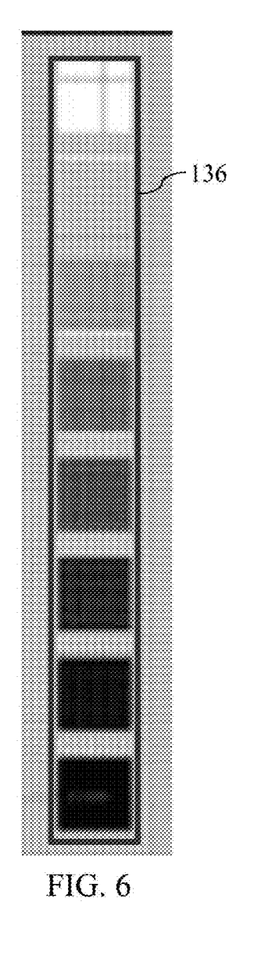
FIGS. 6 and 7 illustrate simulation results used to determine estimated conductive bump height in accordance with some embodiments.
Figure 7:
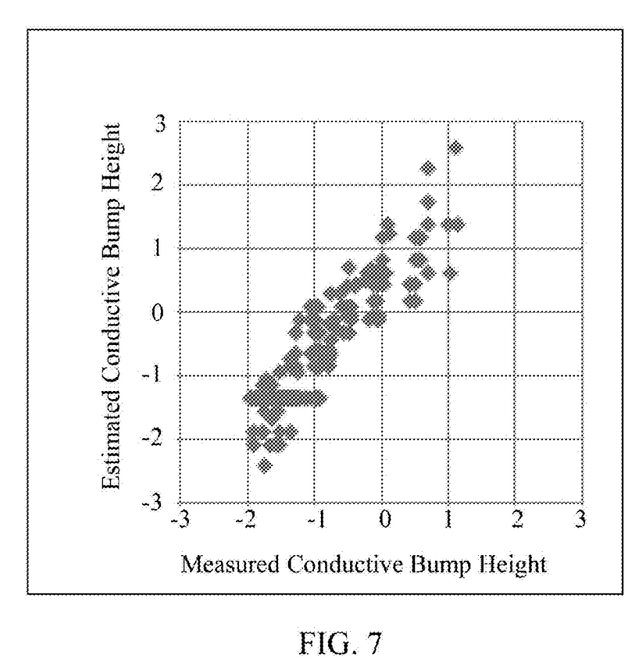

FIGS. 6 and 7 illustrate simulation results that can be used to determine estimated conductive bump height in accordance with some embodiments. Another bump pattern design also with a low to high density designed for validation of the regression model of FIG. 4 is shown in FIG. 6. The design concept of FIG. 6 is the same as in FIG. 4, wherein 8 blocks included in the selected rectangular area 136 have various bump densities from low to high. FIG. 4 illustrates the bump pattern designs used to calculate the correlation of bump height and bump density, and FIG. 6 illustrates different bump pattern designs used to validate the correlation model from FIG. 4, for example.

A regression model of the bump pattern shown in FIG. 6 is shown in FIG. 7, which is a chart of estimated conductive bump heights in the Y axis for a range of measured conductive bump height values in the X axis. The regression model outputs the estimated conductive bump height values shown in FIG. 7. FIG. 7 represents the distribution plot of the estimated bump height of the pattern in FIG. 6 using the regression model and the measured bump height of the pattern in FIG. 6, to show if the estimation is close to measurement. A root mean square error (RMSE) shows the difference between the measurement and the estimation value, and is used as an index to check the estimation accuracy, for example. In the embodiment shown, the RMSE is about 0.49 based on the example data points shown in the graph of FIG. 7 and using an equation such as Equation 2, which is an equation that can be used to calculate a difference between measured and predicted results:

$$RMSE = \text{sqrt}(\Sigma(X\text{predicted} - X\text{measured})2/n);\qquad \text{Eq. 2:}$$

wherein n is the number of data points. Alternatively, the RMSE may comprise other values.

Figure 8:
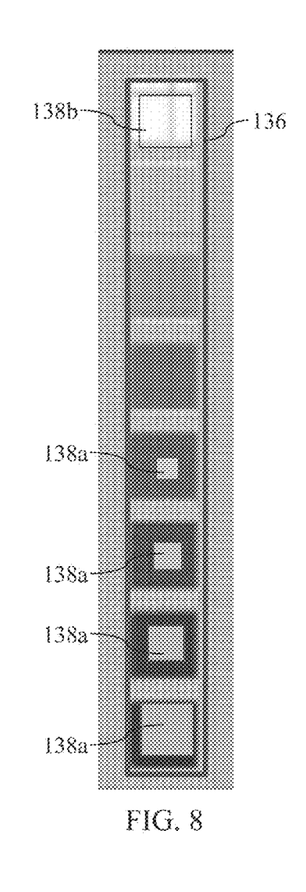
FIGS. 8 and 9 illustrate a method of using the estimated conductive bump height to determine hot spots of the conductive bump pattern in accordance with some embodiments.
Figure 9:
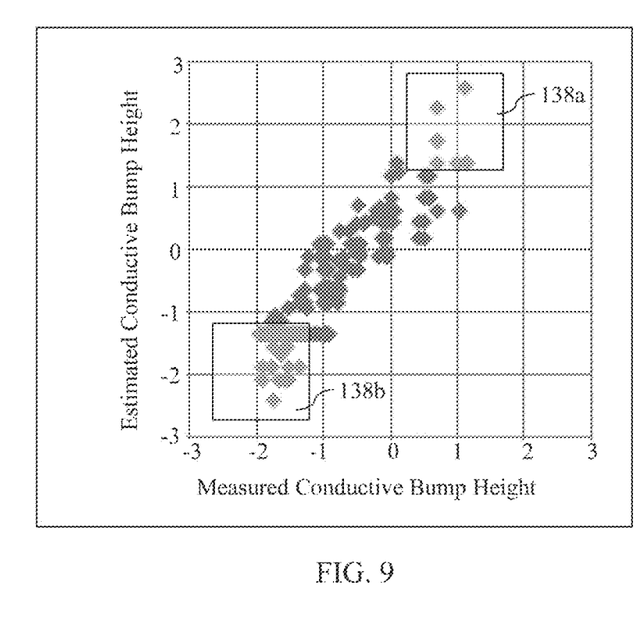

Step 128 of FIG. 2 will next be described. Hot spots are identified for a pattern enhancement guide from the estimated conductive bump height determined in step 126 from the simulation results shown in FIG. 7 that were determined from the regression model shown in FIG. 5. FIGS. 8 and 9 illustrate a method of using the estimated conductive bump height to determine hot spots 138a and 138b of the conductive bump pattern. A bump pattern design with an extremely low and high density is shown in the selected rectangular area 136 in FIG. 8, similar to FIGS. 4 and 6. Highlighted areas of the bump pattern design shown in FIG. 8 are shown in FIG. 9, which is a chart of estimated conductive bump heights in the Y axis for a range of measured conductive bump height values in the X axis. The hot spots 138*a* illustrated in FIG. 8 comprising a low density are shown as hot spots 138*a* in FIG. 9 having large bump heights, and the hot spots 138*b* in FIG. 8 comprising a high density are shown as hot spots 138*b* in FIG. 9 having low bumps heights, for example.

For example, in step 128 of FIG. 2, the term "hot spot" means an area where the estimated average bump height may be extremely low or extremely high, indicated at 138*a* and 138*b*, respectively, in FIG. 9, which indicates the bump height distribution. The areas with extremely high or extremely low average bump heights also comprise the blocks with extremely low or extremely high effective pattern densities D, which are indicated at 138*a* and 138*b*, respectively, in FIG. 8. Higher density blocks have many white points which represent bumps (see the block in FIG. 8 that includes hot spots 138*b*), while lower density blocks have less white points (see the blocks that include hot spots 138*a*). Advantageously, various embodiments of the present disclosure assist designers in foreseeing if there are any blocks with average bump heights that are over a lower or higher end of the specification, and to alert or remind designers to insert or remove bumps in the hot spots 138*a* and 138*b*, respectively, in order to change the effective bump pattern density so that the average bump height will not be out of specification for the semiconductor device or packaging device design, for example.

In other words, the hot spots 138*a* and 138*b* of the chart shown in FIG. 9 indicate estimated conductive bump heights that are above and below an upper specification and a lower specification, respectively. The hot spots 138*a* and 138*b* are an indication to designers to modify the bump pattern by either decreasing the conductive bump density by deleting some conductive bumps in the hot spot region 138*b*, and/or by increasing the conductive bump density by adding some conductive bumps in the hot spot regions 138*a*, for example.

In some embodiments, the hot spots 138*a* and 138*b* comprise conductive bumps with a bump height (BH) having an absolute value greater than about 1 μm (e.g., abs (BH)>1 μm) with a medium BH having a value of about 20 μm, as an example, which is normalized to a BH of 0. The hot spots 138*a* and 138*b* comprise conductive bumps having BHs of between about −1 μm to about +1 μm relative to the medium BH that is established at a BH of 0, for example. The conductive BHs above the upper specification or below the lower specification are highlighted in FIG. 9 at the hot spots 138*b* and 138*a*, respectively. If the average conductive bump height is set as zero, a conductive bump height greater than an average conductive bump height of about 1 μm or a conductive bump height of less than an average conductive bump height of about 1 μm is highlighted in the chart of FIG. 9 that is abs(BH)>1 μm of a medium or average conductive bump height. In the embodiment shown in FIG. 9, the RMSE comprises about 0.49 based on the data points shown in the graph of FIG. 9 and which can be calculated using Equation 2. Alternatively, RMSE may comprise other values.

Figure 10:
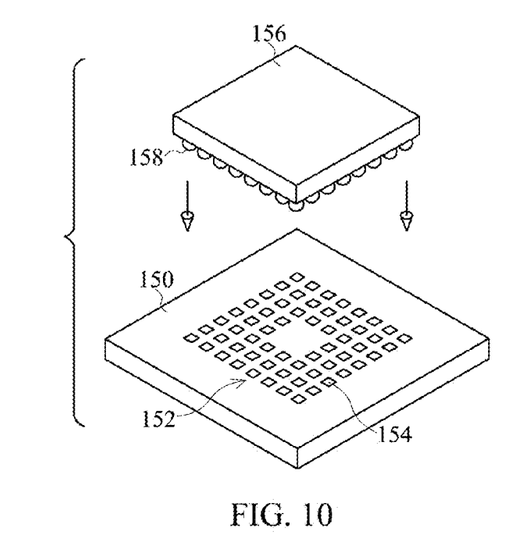
FIG. 10 is a perspective view of a WLP technique in accordance with some embodiments that includes the conductive bump pattern determined in accordance with some embodiments.

FIG. 10 is a perspective view of a WLP technique in accordance with some embodiments. A packaging device 150 comprises an interposer substrate in some embodiments. The conductive bump pattern 152 determined using the methods and embodiments described herein is illustrated comprising an array of contacts 154. The conductive bump pattern 152 determined using the methods and embodiments of the present disclosure is included on a semiconductor device 156 and on the packaging device 150. The semiconductor device 156 is attached to the contacts 154 of the packaging device 150 by a plurality of conductive bumps 158. The conductive bumps 158 are attached to contact pads (not shown) on a surface of the semiconductor device 156 which comprises an integrated circuit, die, or chip, for example. The contact pads are connected to wiring of the semiconductor device 156. The conductive bumps 158 comprise a eutectic material such as solder and provide electrical connections for the semiconductor device 156, for example.

Figure 11:
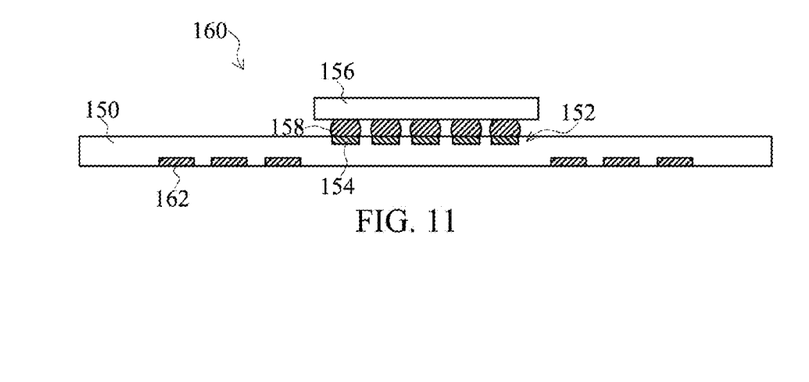
FIG. 11 is a cross-sectional view of the WLP shown in FIG. 10 in accordance with some embodiments.

FIG. 11 is a cross-sectional view of the WLP 160 shown in FIG. 10, after the semiconductor device 156 has been attached to the packaging device 150. The eutectic material of the conductive bumps 158 is reflowed to mechanically and electrically attach the semiconductor device 156 to the packaging device 150. The packaging device 150 includes contacts 162 on an opposite side from the contacts 154. The packaging device 150 includes fan-out wiring such as a redistribution layer (RDL) or other conductive structures (not shown) to electrically connect contacts 154 to contacts 162 in some embodiments.

Figure 12:
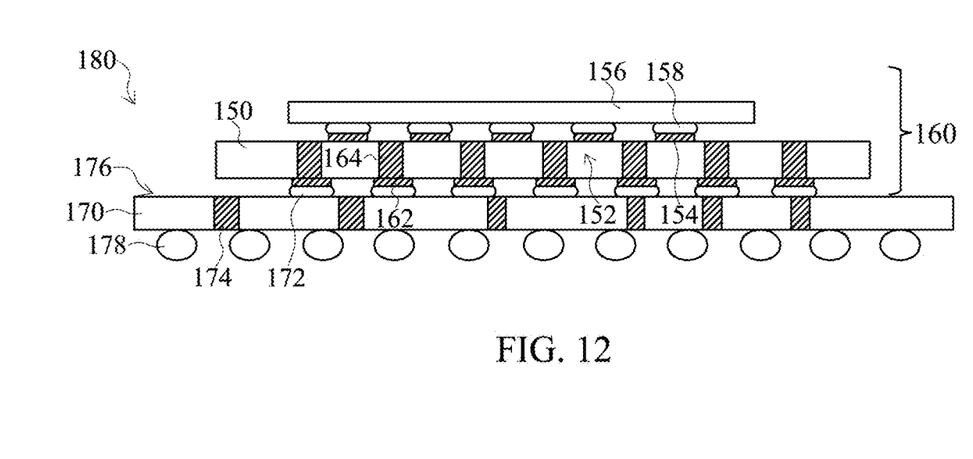
FIG. 12 illustrates a cross-sectional view of a CoWoS package in accordance with some embodiments that includes the conductive bump pattern determined.

FIG. 12 illustrates a cross-sectional view of a CoWoS package 180 in accordance with some embodiments. A chip (e.g., comprising semiconductor device 156) is coupled to a wafer (e.g., comprising packaging device 150 comprising an interposer) which is coupled to a substrate 170. Substrate 170 may comprise a printed circuit board (PCB) or other type of substrate, for example. The packaging device 150 includes a plurality of through-package vias (TPV's) 164 for providing vertical electrical connections of the package in some embodiments. In other embodiments, TPV's 164 are not included in the packaging device 150. Conductive bumps 172 are used to couple the contacts 162 of the packaging device 150 to contacts on the substrate 170. Conductive bumps 158 comprise microbumps and conductive bumps 172 comprise controlled collapse chip connection (C4) bumps in some embodiments, as examples. Conductive balls 178 comprising solder balls are coupled to the opposite side of the substrate 170 in some embodiments. In other embodiments, the conductive balls 178 are not included on the CoWoS 180. Conductive bumps 158 and 172 and conductive balls 178 may alternatively comprise non-spherical or other types of connectors. The substrate 170 may include TPV's 174 and one or more RDL's 176 for providing vertical and horizontal connections, respectively, for the substrate 170 in some embodiments.

Some embodiments of the present disclosure include methods of designing semiconductor devices. Other embodiments of the present disclosure include methods of enhancing conductive bump patterns of a semiconductor device.

Advantages of some embodiments of the present disclosure include providing novel real-time conductive bump pattern enhancement methods for semiconductor devices and semiconductor device packages. The conductive bump pattern enhancement is implementable into a design flow to enable real-time design optimization and enhancement, which assists and guides designers in an early phase of the design process flow. Product designs are optimized by implementing the real-time design enhancement techniques described herein. Process windows are increased, and yield and reliability performance are improved. Robust product designs are achieved in the beginning of the design process using the pattern enhancement models. Back-and-forth design changes when problems are found is avoided, which provides a cost saving by avoiding additional mask and wafer costs. The novel methods of embodiments of the present disclosure provide designers with an advanced ability of verifying and optimizing semiconductor device product designs. Time to market of semiconductor products is reduced by the robust designs achieved. Some embodiments of the present disclosure are particularly advantageous when implemented in the design of semiconductor devices that are packaged in WLP and CoWoS packages. Furthermore, the novel design methods described herein are easily implementable in manufacturing and packaging process flows.

In accordance with some embodiments of the present disclosure, a method of designing a semiconductor device includes designing a conductive bump pattern design, and implementing a conductive bump pattern enhancement algorithm on the conductive bump pattern design to create an enhanced conductive bump pattern design. A routing pattern is designed based on the enhanced conductive bump pattern design. A DRC procedure is performed on the routing pattern.

In accordance with other embodiments, a method of enhancing a conductive bump pattern of a semiconductor device includes inputting a plurality of coordinates for the conductive bump pattern design, and calculating an effective conductive bump pattern density for the conductive bump pattern design. The method includes simulating a conductive bump height for the conductive bump pattern design, and identifying hot spots to create a pattern enhancement guide for the conductive bump pattern design.

In accordance with other embodiments, a method of designing a semiconductor device includes designing a conductive bump pattern design, and implementing a conductive bump pattern enhancement algorithm real-time on the conductive bump pattern design to create an enhanced conductive bump pattern design. The conductive bump pattern enhancement algorithm includes inputting a plurality of coordinates for the conductive bump pattern design, calculating an effective conductive bump pattern density for the conductive bump pattern design, and simulating a conductive bump height for the conductive bump pattern design. The conductive bump pattern enhancement algorithm further includes identifying hot spots to create a pattern enhancement guide for the conductive bump pattern design. The method of designing the semiconductor device includes designing a routing pattern based on the enhanced conductive bump pattern design, and performing a DRC procedure on the routing pattern.

In accordance with some embodiments, a method includes inputting a plurality of coordinates for a conductive bump pattern design, the conductive bump pattern design comprising locations for a plurality of connectors for electrically coupling the semiconductor device to external devices. The method also includes calculating an effective conductive bump pattern density for the conductive bump pattern design. The method also includes simulating a conductive bump height for the conductive bump pattern design. The method also includes identifying hot spots to create a pattern enhancement guide for the conductive bump pattern design. The method also includes generating an enhanced conductive bump pattern design according to the pattern enhancement guide. The method also includes manufacturing an integrated circuit comprising conductive bumps arranged according to the enhanced conductive bump pattern design.

In accordance with some embodiments, a method includes inputting a plurality of coordinates for the conductive bump pattern design, the conductive bump pattern design comprising locations for a plurality of connectors for electrically coupling the semiconductor device to external devices. The method also includes identifying hot spots to create a pattern enhancement guide for the conductive bump pattern design, wherein the hot spots are identified based on an effective conductive bump pattern density for the conductive bump pattern design. The method also includes revising the plurality of coordinates for the conductive bump pattern design according to the pattern enhancement guide.

In accordance with some embodiments, a method, includes inputting a plurality of coordinates for the conductive bump pattern design, the conductive bump pattern design comprising locations for a plurality of connectors for electrically coupling the semiconductor device to external devices. The method also includes calculating an effective conductive bump pattern density for the conductive bump pattern design. The method also includes simulating a conductive bump height for the conductive bump pattern design. The method also includes determining whether the conductive bump height is within an acceptable limit. The method also includes, in response to determining that the conductive bump height is not within an acceptable limit, revising the plurality of coordinates for the conductive bump pattern design.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of designing a semiconductor device, a method comprising:
   inputting a plurality of coordinates for a conductive bump pattern design, the conductive bump pattern design comprising locations for a plurality of conductive bumps for electrically coupling the semiconductor device to external devices;
   calculating an effective conductive bump pattern density for the conductive bump pattern design;
   simulating a conductive bump height for the conductive bump pattern design as a function of the effective conductive bump pattern density; and
   identifying hot spots based on the conductive bump height to create a pattern enhancement guide for the conductive bump pattern design;
   generating an enhanced conductive bump pattern design according to the pattern enhancement guide; and after generating the enhanced conductive bump pattern design, manufacturing the semiconductor device comprising the plurality of conductive bumps arranged according to the enhanced conductive bump pattern design.

2. The method according to claim 1, wherein inputting the plurality of coordinates for the conductive bump pattern design comprises inputting the plurality of coordinates in an $(x_i, y_i)$ format for each of the plurality of conductive bumps in the conductive bump pattern design, and wherein i is a number of a respective one of the plurality of conductive bumps.

3. The method according to claim 2, wherein calculating the effective conductive bump pattern density comprises:
selecting a conductive bump area;
calculating a first density of the selected conductive bump area (A);
calculating a second density of a surrounding area of the selected conductive bump area (B); and
calculating an effective density of the plurality of conductive bumps (D) for the semiconductor device from the selected conductive bump area first density A and the surrounding area second density B.

4. The method according to claim 3, wherein calculating the effective density of the plurality of conductive bumps D comprises using Equation 1:

$$D=(w*A\ \%+(1-w)*B\ \%);\qquad\text{Eq. 1:}$$

wherein w comprises a weighted value.

5. The method according to claim 4, wherein w is in a range of about 0.3 to about 0.5.

6. The method according to claim 4, wherein simulating the conductive bump height comprises using a regression model by inputting the calculated effective density into the regression model, and wherein the regression model outputs an estimated conductive bump height.

7. The method according to claim 1, further comprising re-configuring the plurality of coordinates for the conductive bump pattern design in response to identifying the hot spots.

8. The method according to claim 1, wherein identifying hot spots comprises identifying an area wherein the simulated conductive bump heights have an average bump height that is above a preset threshold.

9. The method according to claim 1, wherein identifying hot spots comprises identifying an area wherein the simulated conductive bump heights have an average bump height that is below a preset threshold.

10. The method according to claim 1, further comprising generating a routing pattern based on the enhanced conductive bump pattern design.

11. A method of designing a semiconductor device, the method comprising:
inputting a plurality of coordinates for a conductive bump pattern design, the conductive bump pattern design comprising locations for a plurality of conductive bumps for electrically coupling the semiconductor device to external devices;
identifying hot spots to create a pattern enhancement guide for the conductive bump pattern design, wherein the hot spots are identified based on conductive bump heights for the conductive bump pattern design, and wherein the conductive bump heights are identified based on an effective conductive bump pattern density for the conductive bump pattern design;
revising the plurality of coordinates for the conductive bump pattern design according to the pattern enhancement guide; and after revising the plurality of coordinates for the conductive bump pattern design, forming the semiconductor device comprising the plurality of conductive bumps arranged according to a plurality of revised coordinates.

12. The method according to claim 11, wherein:
identifying hot spots comprises identifying areas where average estimated conductive bump heights are higher than a preset threshold; and
revising the plurality of coordinates for the conductive bump pattern comprises revising coordinates of conductive bumps in the hot spots in a manner that will reduce the average estimated conductive bump heights in the hot spots.

13. The method according to claim 11, further comprising performing a pass/fail test on the conductive bump pattern design.

14. The method according to claim 11, further comprising:
calculating the effective conductive bump pattern density for the conductive bump pattern design; and
simulating the conductive bump heights for the conductive bump pattern design as a function of the effective conductive bump pattern density.

15. The method according to claim 14, wherein inputting the plurality of coordinates for the conductive bump pattern design comprises inputting the plurality of coordinates in an $(x_i, y_i)$ format for each of the plurality of conductive bumps in the conductive bump pattern design, and wherein i is a number of a respective one of the plurality of conductive bumps.

16. The method according to claim 15, wherein calculating the effective conductive bump pattern density comprises:
selecting a conductive bump area;
calculating a density of the selected conductive bump area;
calculating a density of a surrounding area of the selected conductive bump area; and
calculating an effective density of the plurality of conductive bumps for the semiconductor device from the selected conductive bump area density and the surrounding area density.

17. A method of designing a semiconductor device, the method comprising:
inputting a plurality of coordinates for a conductive bump pattern design, the conductive bump pattern design comprising locations for a plurality of conductive bumps for electrically coupling the semiconductor device to external devices;
calculating an effective conductive bump pattern density for the conductive bump pattern design;
simulating a conductive bump height for the conductive bump pattern design as a function of the effective conductive bump pattern density;
determining whether the conductive bump height is within a preset range;
in response to determining that the conductive bump height is not within the preset range, revising the plurality of coordinates for the conductive bump pattern design; and
after revising the plurality of coordinates for the conductive bump pattern design, forming the semiconductor device comprising the plurality of conductive bumps arranged according to a plurality of revised coordinates.

18. The method according to claim 17, wherein simulating the conductive bump height comprises using a regression model by inputting the calculated effective density into the regression model, and wherein the regression model outputs an estimated conductive bump height.

19. The method according to claim 17, wherein inputting the plurality of coordinates for the conductive bump pattern design comprises inputting the plurality of coordinates in an $(x_i, y_i)$ format for each of the plurality of conductive bumps in the conductive bump pattern design, and wherein i is a number of a respective one of the plurality of conductive bumps.

20. The method according to claim 17, further comprising, after revising the plurality of coordinates for the conductive bump pattern design, generating a routing pattern based on the plurality of revised coordinates for the conductive bump pattern design.

* * * * *